HENRY AITKEN, OF FALKIRK, SCOTLAND.

Letters Patent No. 88,939, dated April 13, 1869.

IMPROVED MODE OF ROASTING IRON-ORES.

The Schedule referred to in these Letters Patent and making part of the same.

*To all whom it may concern:*

Be it known that I, HENRY AITKEN, of Falkirk, Sterling county, Scotland, have invented an Improvement in Treating Ores; and I do hereby declare the following to be a full, clear, and exact description of the same.

Previous to this invention, it has been the practice to prepare iron-ores, or iron-stones, for being smelted in blast-furnace, or otherwise, by calcining or roasting them in heaps, known as bings or clumps, in the open air, or in chambers, to which the air has free access, thereby driving off the volatile matters, and consuming the fixed carbon, and so leaving the iron combined with the silica and other substances, which vary according to the nature of the iron-ores or iron-stones, and are not separated by the process of calcining, or roasting.

The iron-ores, or iron-stones, in being calcined, or roasted, also absorb and retain a large quantity of oxygen from the air.

If not prepared by calcining, or roasting, which it is unnecessary to do with some classes of iron-ores, or iron-stones, they are charged into the blast-furnace in the same state or condition in which they are formed in nature.

The process heretofore in use of calcining, or roasting, has therefore the effect of destroying any fixed carbon that may be in the iron-ores, or iron-stones, while, were it retained, it would wholly or partially assist in the reduction of the iron-ores, or iron-stones, into iron.

Besides, in calcining, or roasting, as heretofore practised, the volatile matters, which might be collected, are entirely lost or destroyed, and the iron-ores, or iron-stones, absorb larger quantities of oxygen from the air than are needful, and thereby they are rendered more difficult and expensive to reduce into the metallic state.

Now, the present invention has for its object the treating or preparing of the iron-ores, or iron-stones, so that the fixed carbon and volatile matters hitherto wasted by calcining, or roasting, are retained or collected, and consists essentially, first, in coking or carbonizing the iron-ores, or iron-stones, in closed or covered heaps, or in a close receptacle, retort, kiln, oven, or chamber, and in collecting or economizing the volatile matters, as hereinafter mentioned; second, in practically carrying out this invention, the iron-ores, or iron-stones, may be coked or carbonized by placing them in receptacles, retorts, kilns, ovens, or chambers, as above described, and passing over or through them a neutral flame; that is, a flame free of oxygen, which may be obtained from any blast or other furnace; third, the gases made while coking the iron-ores, or iron-stones, in a receptacle, kiln, oven, or chamber, or set of such, may be passed through the iron-ores, or iron-stones, in other like receptacles, and so coke or carbonize them.

The gases on their passage from one receptacle, retort, kiln, oven, or chamber, or set of such, may be either partially or wholly consumed before passing through the iron-ores, or iron-stones, in others.

In order to quicken the process of coking, or carbonizing, fans, steam-jets, or any other means of making a draught, may be used.

The volatile matters, such as tar and oil, are collected by condensation, whilst the sulphur and phosphorus thrown or drawn off during the process of coking or carbonizing, by any of the modes herein specified, are collected or economized by any of the processes at present in use.

Any sulphur or phosphorus in the iron-ores, or iron-stones, is driven out, or neutralized by a sufficient quantity of salt placed amongst the iron-ores, or iron-stones, or volatilized through or amongst the same, while the coking or carbonizing process is going on, or after it is finished, and whilst the iron-ores, or iron-stones, are hot.

The iron-ores, or iron-stones, after being coked or carbonized, may be reduced *in situ*, or they may be reduced at once in any kind of blast-furnace, or other apparatus, or they may be cooled or watered out and removed, to be reduced in any way thought proper.

I claim as my invention, and desire to secure by Letters Patent—

1. The treatment of iron-ores, or iron-stones, by coking or carbonizing, in closed or air-tight heaps, or in closed retorts, kilns, ovens, or chambers, so as to retain in them the fixed carbon, and prevent them absorbing too much oxygen, in contradistinction to calcining, or roasting the iron-ores, or iron-stones, in heaps in the open air, or in chambers to which the air has free access.

2. The collecting and utilizing of the volatile matter contained in the iron-ores, or iron-stones, thrown or drawn off in the process of coking or carbonizing, as above described, and which have hitherto been lost.

3. The purification of the coked or carbonized iron-stones by means of salt.

4. The application, in the process above described, directly to the iron-ores, or iron-stones, of a neutral flame, to effect their coking or carbonizing.

5. The coking or carbonizing of iron-ores, or iron-stones, by passing the gases evolved from iron-ores, or iron-stones, being coked or carbonized, in a retort, kiln, chamber, or oven, or set of such, through the iron-ores, or iron-stones, in others.

In testimony whereof, I have signed my name to this specification, in the presence of two subscribing witnesses.

HENRY AITKEN.

Witnesses:
JOHN BROWN,
THOMAS RUSSELL.